March 25, 1969 B. CHAUVIN 3,434,818
APPARATUS FOR SEALING OFF GLASS VESSELS
Filed June 3, 1965

FIG. I.

INVENTOR.
Bernard Chauvin

INVENTOR.
Bernard Chauvin

United States Patent Office 3,434,818
Patented Mar. 25, 1969

3,434,818
APPARATUS FOR SEALING OFF GLASS VESSELS
Bernard Chauvin, Cedar Grove, N.J., assignor to Westinghouse Electric Corporation, Pittsburgh, Pa., a corporation of Pennsylvania
Filed June 3, 1965, Ser. No. 461,053
Int. Cl. C03b 9/42, 23/14, 9/46
U.S. Cl. 65—152                    9 Claims

ABSTRACT OF THE DISCLOSURE

An apparatus for sealing off vessels such as photoflash lamps wherein the vessel is supported by its exhaust tubulation depending from the head of the exhaust machine. At the tipping off station, the lamp is sealed in a pressure chamber provided with a fluid pressure slightly higher than the several atmospheres of oxygen within the lamp envelope and radiant energy at high temperature from a quartz iodine lamp or the like is concentrated on a small area of the exhaust tubulation to heat the exhaust tubulation to the softening temperature whereby the weight of the lamp collapses the tubulation to form a seal.

---

Figure 1:
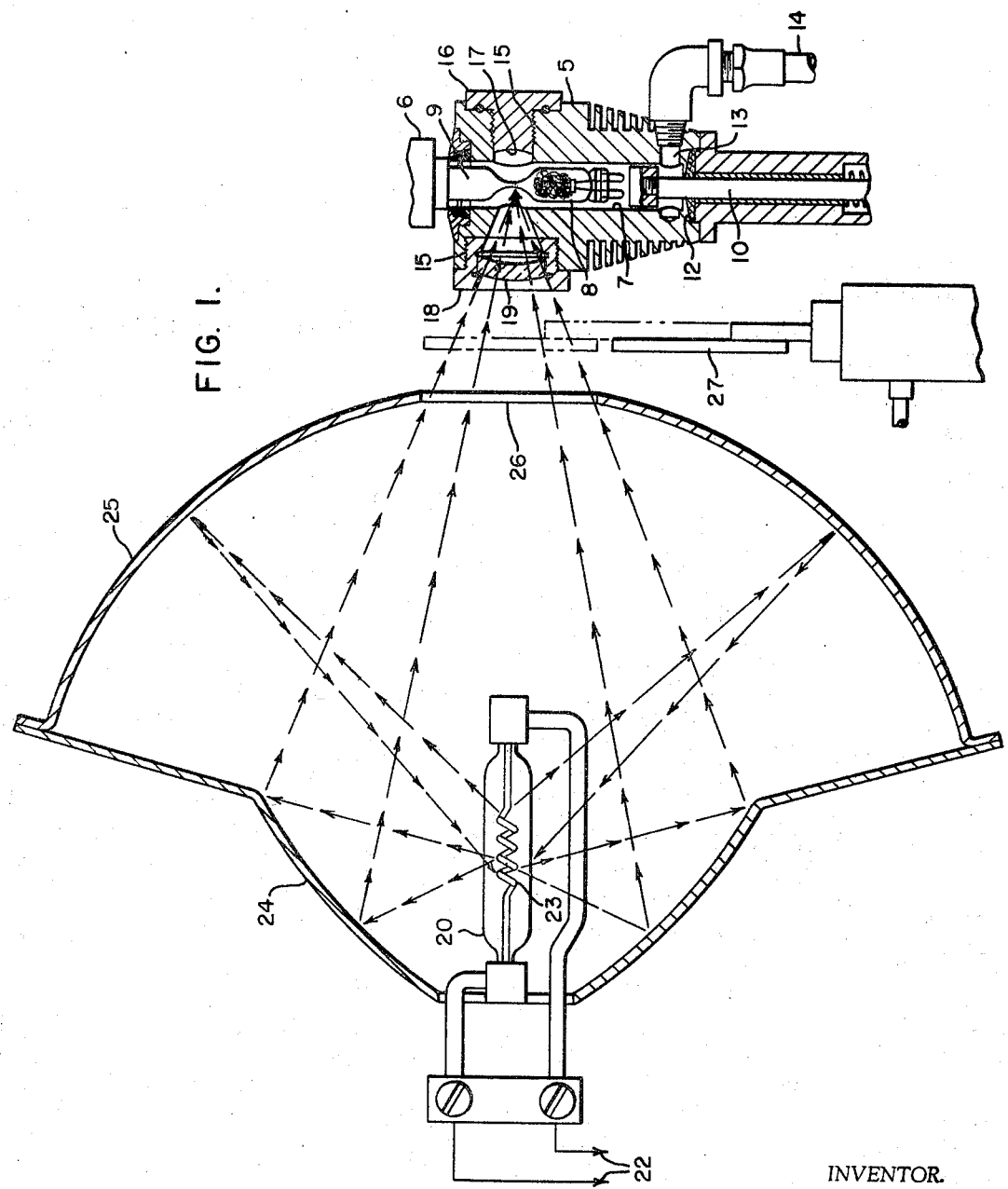

The present invention relates to an apparatus for the sealing off of devices containing gas at a pressure higher than atmospheric, such for example as incandescent lamps and particularly photoflash lamps, containing gas at greater-than-atmospheric pressure, and thus constitutes a modification of such apparatus as shown and claimed in my pending application, Ser. No. 382,478, filed July 14, 1964, now Patent No. 3,320,715 and assigned to the same assignee as the present invention.

In this apparatus as shown and described in the aforementioned copending application, the previous difficulty then inherent in the prior art was completely eliminated by first completely enclosing the lamp in a sealed pressure chamber and then utilizing an electric spark to ignite a sharp and stable gas flame for heating the exhaust tubulation to its softening temperature and drawing it out to seal-off the lamp. Although such method and apparatus achieved the desired purpose, it has been found that the necessity for purging the gas line, creating the ignition spark, and then heating the tubulation to a softening temperature, did consume appreciable time thus tending to restrict production rates and hence increase manufacturing costs.

It is accordingly the primary object of the present invention to provide an apparatus for the sealing off of devices such as photoflash lamps having an internal pressure above atmospheric wherein heating of the exhaust tubulation to its softening temperature occurs substantially instantaneously once the lamp is sealed in its pressure chamber.

Another object of the present invention is the provision of an apparatus for the sealing off of devices such as photoflash lamps having an internal pressure above atmospheric wherein the exhaust tubulation is heated to its softening temperature substantially instantaneously by radiant energy.

A further object of the present invention is the provision of an apparatus for the sealing off of devices such as photoflash lamps having an internal pressure above atmospheric wherein the lamp is enclosed in a sealed pressure chamber and the exhaust tubulation thereof is heated to its softening temperature by radiant energy projected into said pressure chamber at a high temperature.

The foregoing objects of the present invention, together with other objects which will become apparent to those skilled in the art from the following description, are achieved by providing apparatus for the sealing off of devices such as incandescent lamps and photoflash lamps wherein, in the preferred form of the apparatus, the latter depend from the head of an exhaust machine by their exhaust tubulation. In such position the lamps are indexed by the machine into a sealing-off station at which the lamp is enclosed within a sealed pressure chamber. A gaseous filling at several atmospheres of pressure is then introduced into the lamp envelope and a slightly higher pressure built up in the sealed pressure chamber. Thereupon, a beam of radiant energy at a high temperature is projected into the sealed pressure chamber and concentrated on a limited area of the exhaust tubulation to heat it to a softening temperature whereby gravitation of the lamp draws out the exhaust tubulation and causes collapse of a limited area thereof to seal off the gas filled lamp.

Figure 2:
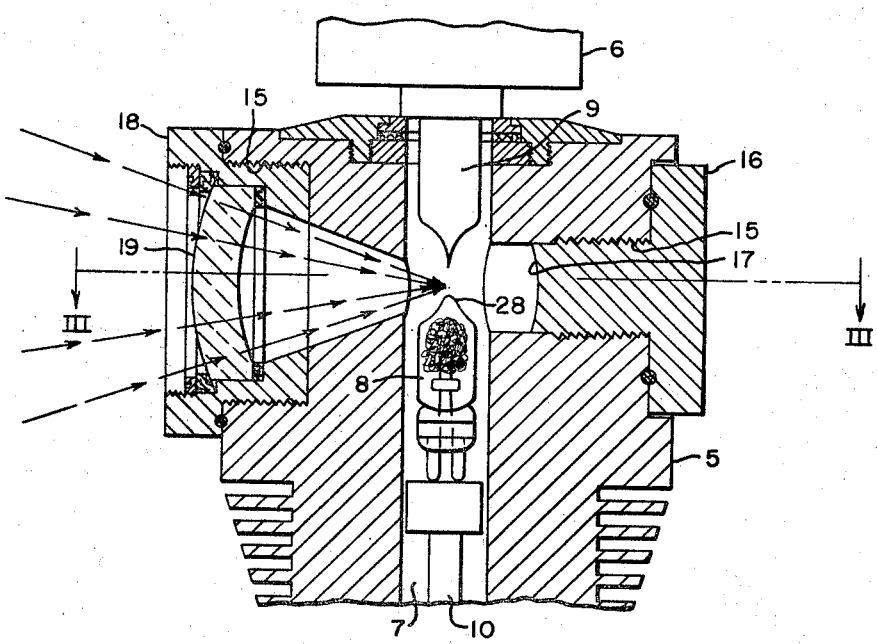
Figure 3:
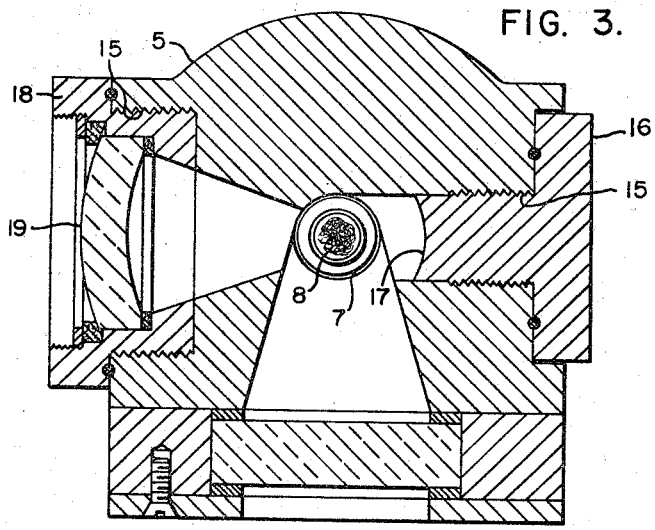

The present invention can be readily understood by reference to the accompanying drawing wherein:

FIGURE 1 is an elevational view partly in cross-section of the pressure chamber positioned at the tipping-off station of an exhaust machine and showing the source of radiant energy at such station which is projected at high temperature into the pressure chamber to heat the exhaust tubulation of a lamp depending from the head of the exhaust machine, FIG. 2 is a fragmentary sectional view on an enlarged scale and showing the pressure chamber portion of FIG. 1 with a photoflash lamp therein just after it has been tipped off from its exhaust tubulation, and FIG. 3 is a cross-sectional view taken on the line III—III of FIG. 2.

Referring now to the drawings in detail, it will be noted from FIG. 1 that the pressure chamber 5 is in its raised position where it forms a static seal with the head 6, when the latter is at the "tipping-off" station of the exhaust machine, in the same manner as shown and described in my aforesaid pending application, Ser. No. 382,478. Such pressure chamber 5 is provided with a central bore 7 for the reception of the photoflash lamp 8 which depends by its exhaust tubulation 9 from the exhaust and gas-fill machine head 6. The opposite end of the bore 7 is closed by a stationary support rod 10 which forms an hermetic seal 12 therewith yet allows reciprocal movement of the pressure chamber 5 longitudinally of this support rod 10. A horizontal bore 13 communicates with the pressure chamber bore 7 and a source of high pressure fluid is supplied to the horizontal bore 13 through a conduit 14 for the purpose of building up a high pressure in such bore 7 and hence interiorly of the pressure chamber 5, which pressure is somewhat greater than that of the oxygen pressure normally introduced into the photoflash lamp 8 through its tubulation 9 from the exhaust machine 6.

The pressure chamber 5 is provided with a further horizontal bore 15 positioned slightly above the depending lamp 8 and hence adjacent the exhaust tubulation 9 with one end of this bore 15 being sealed by a threaded plug 16 carrying a spherical reflector 17 at its innermost end. The diametrically opposite end of this bore 15 flares outwardly and is similarly sealed by a threaded plug 18 provided with a sealed pressurized window 19 coaxially aligned with the spherical reflector 17. Disposed adjacent the pressure chamber 5 is a source of radiant energy, such for example as a 1000 watt T3 quartz iodine lamp 20, which is connected by conductors 22 to a suitable supply source of appropriate electrical energy. The filament 23 of such lamp 20 is centered on one of the focal points of an elliptical reflector 24 which is also the center of a spherical reflector 25 provided with an axially disposed window 26 with both such reflectors formed into an integral unit, as shown in FIG. 1.

The exhaust tubulation 9, at the point where contraction thereof is to occur to form the sealing-off of the photoflash lamp 8, is located at the second focal point of the elliptical reflector 24 and is also at the center of the spherical reflector 17. The rays of radiant energy emitted from the filament 23 impinge upon the surface of the elliptical reflector 24 and the spherical reflector 25. The latter are reflected back to the filament 23 while those from the elliptical reflector 17 pass outwardly through the window 26 and into the pressure chamber 5 through the pressure-tight window 19, as shown by the arrows in FIG. 1. Thus some of the rays directly strike the exhaust tubulation 9 while others first impinge upon the spherical reflector 17 and are reflected back to such exhaust tubulation. This radiant energy at a substantially high temperature accordingly heats the exhaust tubulation 9 to the softening point thus forming the contraction therein, as shown in FIG. 1, and which after approximately one-half to three-quarters of a second collapses upon itself to form a seal.

The oxygen at several atmospheres pressure, such as five atmospheres is thus sealed into the photoflash lamp 8 while a slightly higher fluid pressure is maintained within the pressure chamber 5. Following collapse of the heated exhaust tubulation 9 to form the seal, the weight of the photoflash lamp 8 causes it to gravitate until it rests on the support rod 10 at which time the softened tubulation 9 will be completely severed from the lamp 8, as shown on the enlarged scale of FIG. 2. Thereupon a reciprocally movable shutter 27 rises, as shown by the dotted lines in FIG. 1, to block off all radiant energy from the filament 23 through the window 26 permitting the formed seal 28 (FIG. 2) to harden after which decompression of the pressure chamber 5 occurs followed by withdrawal of the latter from sealing engagement with the head 6 of the exhaust machine. This allows such head to pass to the next indexed station and another head 6 carrying a depending photoflash lamp 8 to be moved into the sealing-off station preparatory to the pressure chamber 5 again moving upwardly and forming a static seal with the newly positioned head 6 and its depending photoflash lamp 8, for repetition of the above noted cycle of operation.

It should thus be apparent to those skilled in the art that an apparatus for sealing-off devices such as photoflash lamps and the like has been herein described in which the exhaust tubulation of such lamps is very rapidly heated to its softening temperature by a source of radiant energy. Such radiant energy source is disposed adjacent the "tipping-off" station of a conventional exhaust machine, so that when a lamp depending by its exhaust tubulation from an exhaust machine head is indexed into such "tipping-off" station, a small area of the exhaust tubulation is immediately subjected to this radiant energy source. The temperature produced by concentration of such source at this small area causes the exhaust tubulation to thereupon collapse thus sealing off the lamp.

As a possible alternative embodiment, the movable shutter 27 could be dispensed with and the sealing lamp 20 deenergized after the predetermined time required to seal off the photoflash lamp 8. As another embodiment, the lamp 20 could be energized continuously, and the pressure chamber 5 timed to move out of the focus of the radiations after the predetermined period of time during which the photoflash lamp 8 is sealed.

As another possible alternative embodiment, the photoflash lamp 8 need not depend from its exhaust tubulation 9 prior to the sealing operation. In such an embodiment, a grasping mechanism could be provided to exert a predetermined pressure which would place a slight tension on the exhaust tubulation 9. Thereafter, when the constricted portion of the exhaust tubulation was heated by the radiations focused through the window 19, the tubulation would rapidly soften to make the lamp seal.

As yet another alternative embodiment, a small amount of radiations-absorbing substance, such as a dark-colored material such as aquadag, may be applied to the constricted portion of the exhaust tubulation to facilitate heating thereof.

Although one specific embodiment of the present invention has been shown and described, it is to be understood that still further modifications threeof may be made without departing from the spirit and scope of the invention.

I claim:
1. An apparatus for sealing off a lamp having an internal and external fluid pressure differential, said apparatus comprising:
  (a) a pressure chamber adapted to receive said lamp provided with a transparent window and disposed adjacent a work station of an exhaust machine to which said lamp is indexed while depending by its exhaust tubulation from a head of said exhaust machine,
  (b) means operable at a predetermined time following indexing of said lamp to said work station to cause said pressure chamber to receive said lamp and form a static seal thereabout,
  (c) a source of radiant energy disposed adjacent said work station for generating high temperature radiation and positioned to direct it through the window of said pressure chamber to a small selected area of the exhaust tubulation of said lamp to heat such area to the softening temperature to thereby cause a collapse of the tubulation to form a seal for said lamp; and
  (d) means reciprocally movable between said source and said lamp to intercept the radiant energy from said source at predetermined periods of time and particularly during indexing of a lamp into and out of said work station.

2. An apparatus for sealing off a lamp having an internal and external fluid pressure differential, said apparatus comprising:
  (a) a pressure chamber adapted to receive said lamp and provided with a transparent window and disposed adjacent a work station of an exhaust machine to which said lamp is indexed while depending by its exhaust tubulation from a head of said exhaust machine,
  (b) means operable at a predetermined time following indexing of said lamp to said work station to cause said pressure chamber to receive said lamp and form a static seal thereabout,
  (c) a source of radiant energy disposed adjacent said work station for generating high temperature radiation and positioned to direct it through the window of said pressure chamber to a small selected area of the exhaust tubulation of said lamp to heat such area to the softening temperature to thereby cause a collapse of the tubulation to form a seal for said lamp, and
  (d) a shutter disposed between said source and said lamp and reciprocally movable to intercept the radiant energy from said source at predetermined periods of time and particularly during indexing of a lamp into and out of said work station.

3. An apparatus for sealing off a device having an internal and external fluid pressure differential, said apparatus comprising:
  (a) a pressure chamber provided with a window and disposed adjacent a work station of an exhaust machine to which said device is indexed while depending by its exhaust tubulation from a head of said exhaust machine,
  (b) means operable at a predetermined time following indexing of said device to said work station to cause said pressure chamber to form a static seal about said device with a fluid pressure in said chamber differing from that in said device,
  (c) a source of radiant energy disposed adjacent said work station comprising an elliptical reflector, a light source for producing high temperature radiations comprising a filament disposed on one focal point of said elliptical reflector with small selected area of the exhaust tubulation at the other focal point of said reflector whereby said high temperature radiations are directed through said chamber window onto the selected area of said exhaust tubulation to heat it to the softening temperature and thereby cause a collapse thereof to form a seal for said device; and (d) a shutter disposed between said pressure chamber and said source and reciprocally movable to intercept the radiant energy from said source at predetermined periods of time and particularly during indexing of a device into and out of said work station.

4. An apparatus for sealing off the open tubulation of a lamp, with the sealed lamp containing a greater-than-atmospheric pressure, said apparatus comprising:

(a) gas-fill means connecting to the open tubulation of the lamp to be sealed off and operable to maintain within the lamp a gaseous atmosphere at a pressure substantially greater than atmospheric;

(b) a pressure chamber means having a wall and operable to receive the lamp to be sealed off and to maintain therein and about the tubulation of the received lamp a gas pressure greater than the greater-than-atmospheric pressure maintained within said lamp by said gas-fill means;

(c) a radiation-transmitting window means forming a part of the wall of said pressure chamber;

(d) a radiation-generating means exterior to said pressure chamber means and operable to emanate focused radiations through said window means to a focal point within said pressure chamber means; and (e) positioning means for positioning the lamp tubulation to be sealed off proximate the focal point of the radiations emanated by said radiation-generating means; whereby the focused radiations soften the tubulation and effect a sealing thereof.

5. The apparatus as specified in claim 4, wherein interrupting means interrupt the radiations emanated by said radiation-generating means after a predetermined period of time sufficient to effect sealing of the tubulation.

6. An apparatus for sealing off the open tubulation of a photoflash lamp, with the sealed lamp containing a greater-than-atmospheric pressure, said apparatus comprising:

(a) gas-fill means connecting to the open tubulation of the lamp to be sealed off and operable to maintain within the lamp a combustion-supporting atmosphere at a pressure substantially greater than atmospheric;

(b) a pressure chamber means having a wall and operable to receive the lamp to be sealed off and to maintain therein and about the received lamp and the tubulation thereof a gas pressure greater than the greater-than-atmospheric pressure maintained within said lamp by said gas fill means;

(c) a radiation-transmitting window means forming a part of the wall of said pressure chamber;

(d) a radiation-generating means exterior to said pressure chamber means and operable to emanate focused radiations through said window means to a focal point within said pressure chamber means;

(e) positioning means for positioning the lamp tubulation to be sealed off proximate the focal point of the radiations emanated by said radiation-generating means; and (f) means for maintaining a tension on the lamp tubulation to be sealed off to facilitate making the seal when the lamp tubulation is softened by the focused radiations emanated by said radiation-generating means.

7. The apparatus as specified in claim 6, wherein interrupting means interrupt the radiations emanated by said radiation-generating means after a predetermined period of time sufficient to effect sealing of the tubulation.

8. An apparatus for sealing off the open tubulation of a photoflash lamp, with the sealed lamp containing a greater-than-atmospheric pressure, said apparatus comprising:

(a) gas-fill means connecting to the open tubulation of the lamp to be sealed off and operable to maintain within the lamp a combustion-supporting atmosphere at a pressure substantially greater than atmospheric;

(b) a pressure chamber means having a wall and operable to receive the lamp to be sealed off and to maintain therein and about the tubulation of the received lamp a gas pressure greater than the greater-than-atmospheric pressure maintained within said lamp by said gas-fill means;

(c) a radiation-transmitting window means forming a part of the wall of said pressure chamber;

(d) a radiation-generating means exterior to said pressure chamber means and operable to emanate focused radiations through said window means to a focal point within said pressure chamber means;

(e) reflector means positioned within said pressure-chamber means opposite from said radiation-transmitting window means, said reflector means having a focal point which is proximate the focal point of the focused radiations emanated by said radiation-generating means;

(f) positioning means for positioning the lamp tubulation to be sealed off proximate the focal point of the radiations emanated by said radiation-generating means; and (g) means for maintaining a tension on the lamp tubulation to be sealed off to facilitate making the seal when the lamp tubulation is softened by the focused radiations emanated by said radiation-generating means.

9. The apparatus as specified in claim 8, wherein interrupting means interrupt the radiations emanated by said radiation-generating means after a predetermined period of time sufficient to effect sealing of the tubulation.

References Cited

UNITED STATES PATENTS

| 2,273,445 | 2/1942 | McGowan et al. | 65—155 X |
| 3,100,251 | 8/1963 | Johnson | 65—270 X |
| 3,322,524 | 5/1967 | Chanowitz | 65—110 |

FOREIGN PATENTS

| 777,140 | 6/1957 | Great Britain. |

DONALL H. SYLVESTER, *Primary Examiner.*

A. D. KELLOGG, *Assistant Examiner.*

U.S. Cl. X.R.

65—34, 110, 155, 270, 283